US012585213B2

(12) United States Patent
Yamada

(10) Patent No.: US 12,585,213 B2
(45) Date of Patent: Mar. 24, 2026

(54) IMAGE FORMING APPARATUS WITH POWDER CONVEYING DEVICE HAVING REVERSE ROTATION MODE

(71) Applicant: Tatsumi Yamada, Kanagawa (JP)

(72) Inventor: Tatsumi Yamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/704,501

(22) PCT Filed: Dec. 6, 2022

(86) PCT No.: PCT/IB2022/061796
§ 371 (c)(1),
(2) Date: Apr. 25, 2024

(87) PCT Pub. No.: WO2023/135467
PCT Pub. Date: Jul. 20, 2023

(65) Prior Publication Data

US 2025/0231506 A1 Jul. 17, 2025

(30) Foreign Application Priority Data

Jan. 17, 2022 (JP) ................................ 2022-004882

(51) Int. Cl.
*G03G 15/08* (2006.01)

(52) U.S. Cl.
CPC ..... *G03G 15/0891* (2013.01); *G03G 15/0877* (2013.01); *G03G 15/0879* (2013.01);
(Continued)

(58) Field of Classification Search
CPC .......... G03G 15/0891; G03G 15/0879; G03G 15/0889; G03G 2215/0827; G03G 15/0877; G03G 2215/0668
See application file for complete search history.

(56) References Cited

U.S. PATENT DOCUMENTS

2015/0277293 A1* 10/2015 Maehara ........... G03G 15/0891 399/258
2015/0331383 A1 11/2015 Takahashi et al.
(Continued)

FOREIGN PATENT DOCUMENTS

JP 2000-172076 A 6/2000
JP 2009-020428 A 1/2009
(Continued)

OTHER PUBLICATIONS

International Search Report and Written Opinion issued on Mar. 10, 2023 in PCT/IB2022/061796 filed on Dec. 6, 2022, 10 pages.
(Continued)

*Primary Examiner* — Stephanie E Bloss
*Assistant Examiner* — Laura Roth
(74) *Attorney, Agent, or Firm* — XSENSUS LLP

(57) ABSTRACT

An image forming apparatus including a conveyor disposed in a conveyance passage for conveying powder from a supply source to a supply destination in a forward direction during a supply mode. A controller is configured to execute a reverse rotation mode before the supply mode is executed. In this mode, the controller causes the conveyor to first rotate in a reverse direction and then rotate in a forward direction.

6 Claims, 7 Drawing Sheets

(52) U.S. Cl.
CPC . *G03G 15/0889* (2013.01); *G03G 2215/0668* (2013.01); *G03G 2215/0827* (2013.01)

(56) References Cited

U.S. PATENT DOCUMENTS

| | | | | |
|---|---|---|---|---|
| 2016/0342120 | A1 | 11/2016 | Saitoh et al. | |
| 2017/0115606 | A1 | 4/2017 | Sakamaki | |
| 2017/0139365 | A1 | 5/2017 | Ootsuka et al. | |
| 2021/0302875 | A1 | 9/2021 | Matsunae | |
| 2023/0152733 | A1* | 5/2023 | Miyazaki | G03G 21/1652 399/53 |

FOREIGN PATENT DOCUMENTS

| | | | |
|---|---|---|---|
| JP | 2010-102269 | A | 5/2010 |
| JP | 2011-242576 | A | 12/2011 |
| JP | 2012-103314 | A | 5/2012 |
| JP | 2021-156987 | A | 10/2021 |

OTHER PUBLICATIONS

Office Action issued Sep. 17, 2025 in Japanese Patent Application No. 2022-004882, 8 pages.

* cited by examiner

IMAGE FORMING APPARATUS WITH POWDER CONVEYING DEVICE HAVING REVERSE ROTATION MODE

CROSS-REFERENCE TO RELATED APPLICATIONS

The present application is based on PCT filing PCT/IB2022/061796, filed Dec. 6, 2022, which claims priority to Japanese Patent Application No. 2022-004882, filed on Jan. 17, 2022, the entire contents of each are incorporated herein by its reference.

TECHNICAL FIELD

Embodiments of the present disclosure relate to a powder conveying device that conveys powder such as toner and an image forming apparatus incorporating the powder conveying device.

BACKGROUND ART

Some technologies have been known in which an image forming apparatus such as a copying machine, a printer, a facsimile machine, or a multifunction peripheral thereof includes a powder conveying device for conveying powder such as toner, and the powder conveying device includes a conveyor such as a conveying screw disposed in a conveyance passage (for example, PTL 1).

On the other hand, PTL 2 describes a technology in which a screw pump is connected to a tube for supplying toner to a developing device and a screw in the screw pump is rotated in reverse after a toner supply operation for the purpose of preventing toner clogging in the tube.

CITATION LIST

Patent Literature

[PTL 1]
Japanese Unexamined Patent Application Publication No. 2012-103314
[PTL 2]
Japanese Unexamined Patent Application Publication No. 2000-172076

SUMMARY OF INVENTION

Technical Problem

In the related art, clogging (conveyance failure) of powder may occur in a powder conveying device. Such clogging of powder may cause a problem such as short of powder (supply failure) at a supply destination to which powder is supplied from the powder conveying device. Even if the technology of PTL 2 is applied and a conveyor is rotated in reverse after powder is supplied to the supply destination, such a problem cannot be sufficiently solved by using the technology of PTL 2.

This disclosure is made in light of the above-described problem, an object of this disclosure is to provide a powder conveying device and an image forming apparatus, in which a conveyance failure of powder is less likely to occur.

Solution to Problem

According to an embodiment of the present disclosure, an image forming apparatus includes a conveyor, a conveyance passage, and a controller. The conveyor rotates in a forward direction to convey powder in a supply mode in which the conveyor supplies the powder from a supply source to a supply destination. The conveyor is disposed in the conveyance passage. The controller executes a reverse rotation mode to rotate the conveyor in a reverse direction before execution of the supply mode.

Advantageous Effects of Invention

According to an embodiment of the present disclosure, a powder conveying device and an image forming apparatus, in which a conveyance failure of powder is less likely to occur, can be provided.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
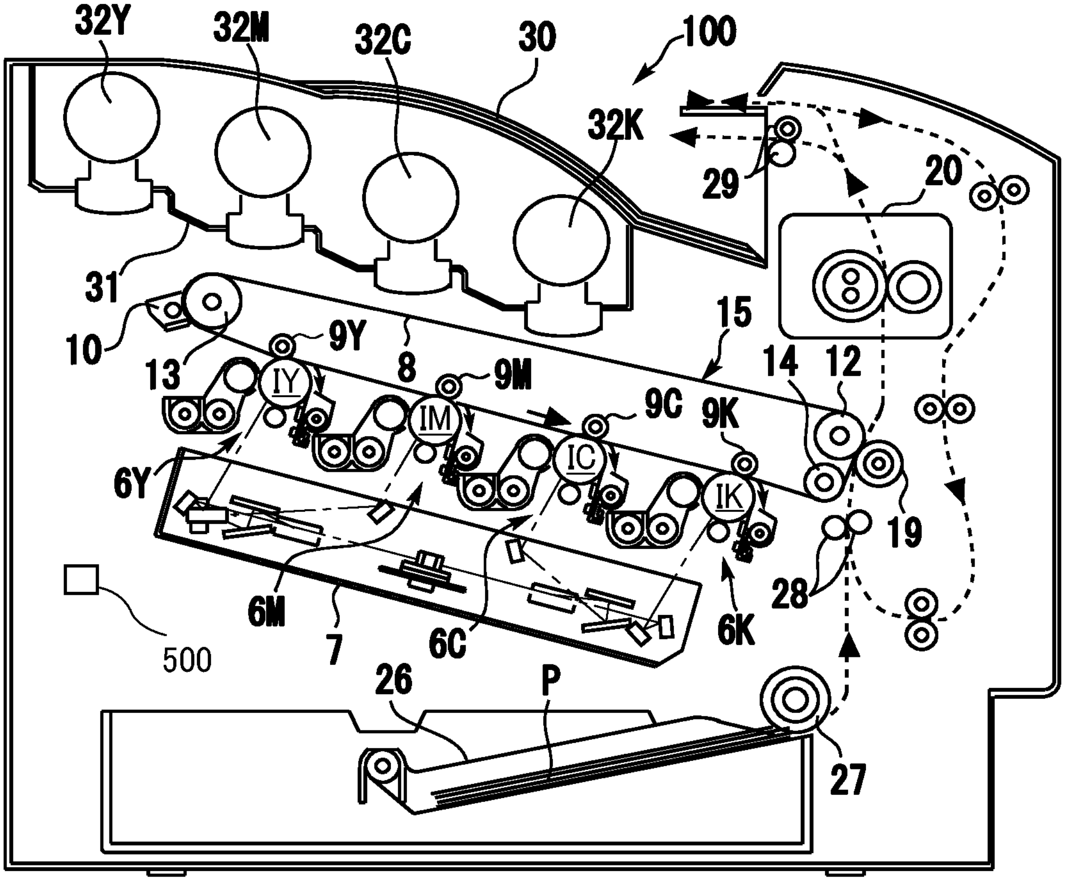
FIG. 1 is a diagram illustrating an overall configuration of an image forming apparatus according to an embodiment of the present disclosure.

The terminology used herein is for the purpose of describing particular embodiments only and is not intended to be limiting of the present invention. As used herein, the singular forms “a,” “an,” and “the” are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Figure 2:
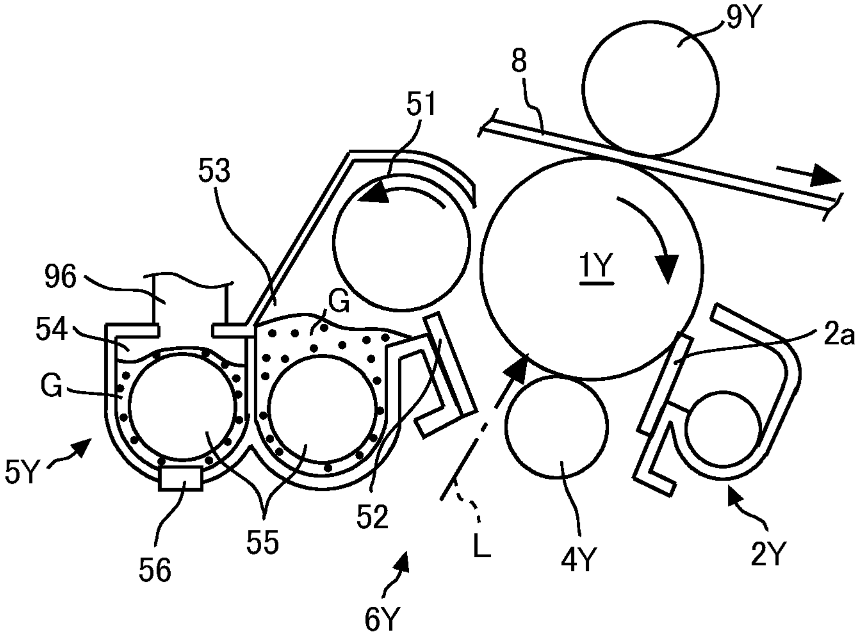
FIG. 2 is a cross-sectional view of an image forming device of the image forming apparatus of FIG. 1.
Figure 3:
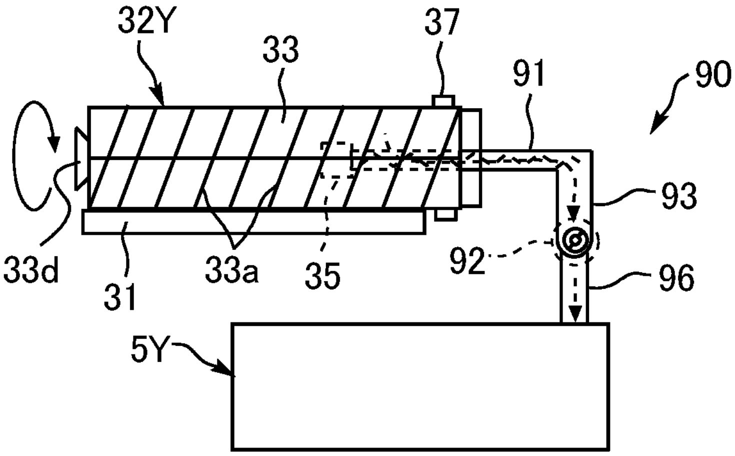
FIG. 3 is an overall configuration diagram illustrating a toner supply device (powder conveying device) and the vicinity thereof.

With reference to FIGS. 1 to 3, an overall configuration and operation of an image forming apparatus 100 are described below. FIG. 1 is a schematic view of a printer as an image forming apparatus. FIG. 2 is an enlarged view of an image forming device of the image forming apparatus. FIG. 3 is a schematic view of a toner supply device as a powder conveying device and the vicinity thereof. As illustrated in FIG. 1, the image forming apparatus 100 includes an installation section 31 (serving as a toner container rack) in an upper portion of a body of the image forming apparatus 100. Substantially cylindrical toner containers 32Y. 32M, 32C, and 32K are detachably (replaceably) attached to the installation section 31. The four toner containers 32Y, 32M, 32C, and 32K correspond to four colors, that is, yellow, magenta, cyan, and black, respectively. An intermediate transfer unit 15 is disposed below the installation section 31. Image forming devices 6Y, 6M, 6C, and 6K corresponding to colors of yellow, magenta, cyan, and black, respectively, are arranged side by side to face an intermediate transfer belt 8 of the intermediate transfer unit 15.

With reference to FIG. 2, the image forming device 6Y for yellow includes a photoconductor drum 1Y (serving as an image bearer), a charging device 4Y, a developing device 5Y, a cleaning device 2Y, and a discharging device that are disposed around the photoconductor drum 1Y. Image forming processes (i.e., charging process, exposure process, development process, transfer process, cleaning process, and charge eliminating process) are executed on the photoconductor drum 1Y. Thus, a yellow toner image is formed on the surface of the photoconductor drum 1Y.

The other three image forming devices 6M, 6C, and 6K have substantially similar configuration to that of the image forming device 6Y for yellow except for the color of toner used therein and form magenta, cyan, and black toner images, respectively. Only the image forming device 6Y for yellow is described below and descriptions of the other three image forming devices 6M, 6C, and 6K are omitted to avoid redundancy.

With reference to FIG. 2, the photoconductor drum 1Y is driven to rotate clockwise in FIG. 2 by a motor. The charging device 4Y uniformly charges the surface of the photoconductor drum 1Y (a charging process). When the surface of the photoconductor drum 1Y reaches a position at which the surface of the photoconductor drum 1Y is irradiated with laser beam L emitted from an exposure device 7 (a writing device, see FIG. 1), the photoconductor drum 1Y is scanned with the laser beam L. Thus, an electrostatic latent image corresponding to yellow is formed on the photoconductor drum 1Y (an exposure process).

When the surface of the photoconductor drum 1Y reaches a position facing the developing device 5Y, at the position, the electrostatic latent image is developed with the toner into a yellow toner image (a development process). When the surface of the photoconductor drum 1Y bearing the toner image reaches a position facing a primary transfer roller 9Y via the intermediate transfer belt 8, at the position, the toner image on the photoconductor drum 1Y is transferred onto the intermediate transfer belt 8 (a primary transfer process). After the primary transfer process, a slight amount of untransferred toner remains on the photoconductor drum 1Y.

When the surface of the photoconductor drum 1Y reaches a position facing the cleaning device 2Y, a cleaning blade 2*a* collects the untransferred toner from the photoconductor drum 1Y into the cleaning device 2Y (a cleaning process). Finally, the surface of the photoconductor drum 1Y reaches a position facing the discharging device, and the discharging device removes residual potentials from the photoconductor drum 1Y. Thus, a series of image forming processes performed on the surface of the photoconductor drum 1Y is completed.

Note that the other image forming devices 6M, 6C, and 6K execute the series of image forming processes described above in substantially same manner as the image forming device 6Y. That is, the exposure device 7 disposed below the image forming devices 6M, 6C, and 6K irradiates photoconductor drums 1M, 1C, and 1K of the image forming devices 6M, 6C, and 6K, respectively, with the laser beams L based on image data. Specifically, in the exposure device 7, a light source emits the laser beam L, which is deflected by a polygon mirror rotated. The laser beam L then reaches the photoconductor drum 1 via multiple optical elements. Thus, the exposure device 7 scans the surface of each of the photoconductor drums 1M, 1C, and 1K with the laser beam L. Then, the toner images formed on the photoconductor drums 1M, 1C, and 1K through the development process are transferred and superimposed on the intermediate transfer belt 8. Thus, a color toner image is formed on the intermediate transfer belt 8.

The intermediate transfer unit 15 includes the intermediate transfer belt 8 as an intermediate transferor, four primary transfer rollers 9Y, 9M, 9C, and 9K, a secondary-transfer counter roller 12, a cleaning backup roller 13, a tension roller 14, and an intermediate transfer cleaning device 10. The intermediate transfer belt 8 is extended and supported by the secondary-transfer counter roller 12, the cleaning backup roller 13, and the tension roller 14. The secondary-transfer counter roller 12 serves as a driving roller to rotate the intermediate transfer belt 8 in the direction (counterclockwise) indicated by an arrow in FIG. 1.

Each of the four primary transfer rollers 9Y, 9M, 9C, and 9K nips the intermediate transfer belt 8 with the corresponding one of the photoconductor drums 1Y, 1M, 1C, and 1K to form an area of contact, herein called a primary transfer nip, between the intermediate transfer belt 8 and the corresponding one of the photoconductor drums 1Y, 1M, 1C, and 1K. A primary-transfer bias opposite in polarity to the toner is applied to the primary transfer rollers 9Y, 9M, 9C, and 9K. The intermediate transfer belt 8 travels in the direction (counterclockwise) indicated by an arrow in FIG. 1 and sequentially passes through the primary transfer nips of the primary transfer rollers 9Y, 9M, 9C, and 9K. As a result, the single-color toner images on the photoconductor drums 1Y. 1M, 1C, and 1K, having the respective colors, are primarily transferred to and superimposed onto the intermediate transfer belt 8, thereby forming the multicolor toner image (a primary transfer process).

Subsequently, the intermediate transfer belt 8 that the toner images of the respective colors are transferred to and superimposed onto reaches a position opposite a secondary transfer roller 19. At the position, the intermediate transfer belt 8 is nipped between the secondary-transfer counter roller 12 and the secondary transfer roller 19 to form a secondary transfer nip. The toner images of four colors formed on the intermediate transfer belt 8 are transferred onto a sheet P such as a sheet of paper conveyed to the position of the secondary transfer nip (a secondary transfer process). At that time, the untransferred toner that has not transferred onto the sheet P remains on the surface of the intermediate transfer belt 8.

The surface of the intermediate transfer belt 8 then reaches a position opposite the intermediate transfer cleaning device 10. At the position, the intermediate-transfer-belt cleaner collects the untransferred toner from the surface of the intermediate transfer belt 8. As a result, a series of transfer processes executed on the outer circumferential surface of the intermediate transfer belt 8 is completed.

The sheet P is conveyed from a sheet feeder 26 disposed in a lower portion of the body of the image forming apparatus 100 to the secondary transfer nip via a feed roller 27 and a registration roller pair 28. Specifically, the sheet feeder 26 contains a stack of multiple sheets P such as sheets of paper stacked on one on another. As the feed roller 27 is rotated counterclockwise in FIG. 1, the feed roller 27 feeds a top sheet P from the stack in the sheet feeder 26 to a roller nip between the registration roller pair 28.

The sheet P conveyed to the registration roller pair 28 (serving as a timing roller pair) temporarily stops at the roller nip between the rollers of the registration roller pair 28 that has stopped driving to rotate. Rotation of the registration roller pair 28 is timed to convey the sheet P toward the secondary transfer nip such that the sheet P meets the color toner image on the intermediate transfer belt 8 at the secondary transfer nip. Thus, the desired color image is transferred onto the sheet P.

Subsequently, the sheet P, onto which the color toner image is transferred at the secondary transfer nip, is conveyed to a position of a fixing device 20. Then, at this position, the color toner image transferred to the surface of the sheet P is fixed on the sheet P by heat and pressure of the fixing roller and the pressure roller (a fixing process). Thereafter, the sheet P is conveyed through the rollers of an output roller pair 29 and ejected to the outside of the image forming apparatus 100. The sheets P ejected by the output roller pair 29 to the outside of the image forming apparatus 100 are sequentially stacked as output images on a stack tray 30. Thus, a series of image forming processes (printing operation) in the image forming apparatus is completed.

Next, a detailed description is provided of a configuration and operation of the developing device 5Y (supply destination) of the image forming device 6Y with reference to FIG. 2. The developing device 5Y includes a developing roller 51, a doctor blade 52, two conveying screws 55, and a toner concentration sensor 56. The developing roller 51 faces the photoconductor drum 1Y. The doctor blade 52 faces the developing roller 51. The two conveying screws 55 are disposed within developer housings 53 and 54. The toner concentration sensor 56 detects a concentration of toner in developer G. The developing roller 51 includes magnets and a sleeve. The magnets are fixed inside the developing roller 51. The sleeve rotates around the magnets. The developer housings 53 and 54 contain the two-component developer G including carrier (i.e., carrier particles) and toner (i.e., toner particles).

The developing device 5Y described above operates as follows. The sleeve of the developing roller 51 rotates in the direction indicated by an arrow in FIG. 2. The developer G is borne on the developing roller 51 by a magnetic field generated by the magnets. As the sleeve rotates, the developer G moves along the circumference of the developing roller 51. The developer G in the developing device 5Y is adjusted so that the ratio of toner (i.e., toner concentration) in the developer G is within a specified range. Specifically, a toner supply device 90 (see FIG. 3) serving as a powder conveying device that supplies toner from the toner container 32Y to the developer housing 54 (see FIG. 2) according to the toner consumption in the developing device 5Y.

The toner (as powder) supplied in the developer housing 54 is stirred and mixed together with the developer G and circulated through the two developer housings 53 and 54 by the two conveying screws 55 (i.e., in a longitudinal direction perpendicular to the plane on which FIG. 2 is illustrated). The toner in the developer G is electrically charged by friction together with the carrier and thus is attracted to the carrier. Both the toner and the carrier are borne on the developing roller 51 due to a magnetic force generated on the developing roller 51. The developer G borne on the developing roller 51 is conveyed in a direction (counterclockwise) indicated by an arrow in FIG. 3 and reaches a position opposite the doctor blade 52. The doctor blade 52 adjusts the amount of the developer borne on the developing roller 51 to an appropriate amount. Thereafter, the developer G on the developing roller 51 is conveyed to a position opposite the photoconductor drum 1Y (a developing area). The toner is attracted to the electrostatic latent image formed on the photoconductor drum 1Y by an electric field generated in the developing area. Subsequently, as the sleeve rotates, the developer G remaining on the developing roller 51 reaches an upper portion of the developer housing 53 and separates from the developing roller 51.

Next, with reference to FIG. 3, a configuration and operation of the toner supply device 90 as the powder conveying device are briefly described. The toner supply device 90 rotationally drives a container body 33 of the toner container 32Y (a powder container) installed in the installation section 31 in a predetermined direction (in the direction indicated by arrow in FIG. 3), discharges the toner contained in the toner container 32Y to the outside of the toner container 32Y, and guides the toner to the developing device 5Y via a first conveyance passage 91, a fall passage 93 (a first fall passage), a second conveyance passage 92, and a conveying tube 96 (a second conveyance passage). The toner supply device 90 includes a toner supply passage (a toner conveyance passage).

The toner supply devices 90 supply the color toners contained in the toner containers 32Y, 32M, 32C, and 32K installed in the installation section 31 in the body of the image forming apparatus 100 to the corresponding developing devices 5Y, 5M, 5C, and 5K, respectively. The amount of toner supplied to each developing device 5 is determined based on the amount of toner consumed in the corresponding developing device 5. The four toner supply devices 90 have a similar configuration except the color of the toner used in the image forming processes. Specifically, with reference to FIG. 3 (and FIGS. 5A to 5C), when the toner container 32Y is attached to the installation section 31 of the body of the image forming apparatus 100, the first conveyance passage 91 (nozzle) of the body of the image forming apparatus 100 pushes and moves a shutter 35 of the toner container 32Y. As a result, the first conveyance passage 91 is inserted into the toner container 32Y (container body 33) via a through-hole 34*a*1. Accordingly, the toner stored in the toner container 32Y can be discharged through the first conveyance passage 91. The toner container 32Y includes a gripper 33*d* at the bottom portion (i.e., left side in FIG. 3) of the toner container 32Y so that a user easily attaches the toner container 32Y to the installation section 31. The user grips the gripper 33*d* to install the toner container 32Y in the installation section 31 and take out the toner container 32Y from the installation section 31.

Referring to FIG. 3, the toner container 32Y includes the container body 33 having a spiral groove 33*a* extending in the longitudinal direction (i.e., the left and right direction in FIG. 3) and the axial direction of the container body 33. Specifically, the spiral groove 33*a* is formed from an outer circumferential surface toward an inner circumferential surface of the container body 33 so that a rotation of the container body 33 convey the toner in the container body 33 from the left side to the right side in FIG. 3. The toner conveyed from the left side to the right side in FIG. 3 inside the container body 33 is discharged to the outside of the toner container 32Y through the first conveyance passage 91. A gear 37 is disposed on the outer circumferential surface of the head of the container body 33 (i.e., right side of the container body 33 in FIG. 3). The gear 37 meshes with a gear 115 of a drive mechanism 110 (see FIG. 7) of the body of the image forming apparatus 100 (toner supply device 90). When the toner container 32Y is attached to the installation section 31, the gear 37 of the container body 33 meshes with the gear 115 (see FIG. 7) of the body of the image forming apparatus 100. As a drive motor 111 (see FIG. 7) is driven, the driving force is transmitted to the gear 37 via a gear train, thus the container body 33 is driven to rotate. The configuration and operation of the toner supply device 90 are described in detail below with reference to FIGS. 6 to 8.

With reference to FIGS. 4, 5A, 5B, and 5C, a detailed description is provided of the toner containers 32Y, 32M, 32C, and 32K further in detail below. FIGS. 4, 5A, 5B, and 5C are cross-sectional side views of the toner container 32Y. The drawings illustrate a side of the toner container 32Y opposite to the side illustrated in FIG. 3. The left and right of FIG. 3 are reversed in FIGS. 4, 5A, 5B, and 5C).

As described above with reference to FIGS. 1 to 3, the toner container 32Y stores toner therein and is detachably attached to the body of the image forming apparatus 100 (or the toner supply device 90). Referring to FIGS. 4, 5A, 5B, and 5C, the toner container 32Y includes the container body 33 and a shutter unit (i.e., including a holder 34, the shutter 35, a rod 36, and a compression spring 38). The shutter unit includes, for example, the holder 34, the shutter 35, the rod 36, and the compression spring 38. The holder 34 has an attachment 34*a* that functions as a cap. The container body 33 is secured to the attachment 34*a* (i.e., the holder 34) and is a bottle with the spiral groove 33*a* formed on the inner circumferential surface of the container body 33. The holder 34 (and the shutter 35, the rod 36, and the compression spring 38) having the attachment 34*a*, and the container body 33 are driven to rotate by the drive motor 111 (drive mechanism 110) disposed in the body of the image forming apparatus 100 in a state in which the toner container 32Y is installed in the body of the image forming apparatus 100 (installation section 31). The toner stored in the toner container 32Y is discharged via the first conveyance passage 91.

With reference to FIGS. 4, 5A, 5B, and 5C, the shutter 35 opens and closes the through-hole 34*a*1 to which the first conveyance passage 91 (which is installed in the toner supply device 90) is inserted in conjunction with the installation operation of the toner container 32Y to the body of the image forming apparatus 100. The shutter 35 is made of a resin material and molded together with the rod 36 which is described below. The shutter 35 is fitted into the through-hole 34*a*1 from the inside of the toner container 32Y and latched not to come off outside the container body 33. Toner is not discharged to the outside of the toner container 32Y in the state in which the through-hole 34*al* is closed by the shutter 35. Toner is discharged to the outside of the toner container 32Y in the state in which the through-hole 34*a*1 is opened by the shutter 35. The through-hole 34*al* is a through-hole having a substantially columnar shape centered on the center of rotation of the container body 33. The shutter 35 is a stopper-shaped member to fit into the through-hole 34*al* having such a cylindrical shape.

Figure 4:
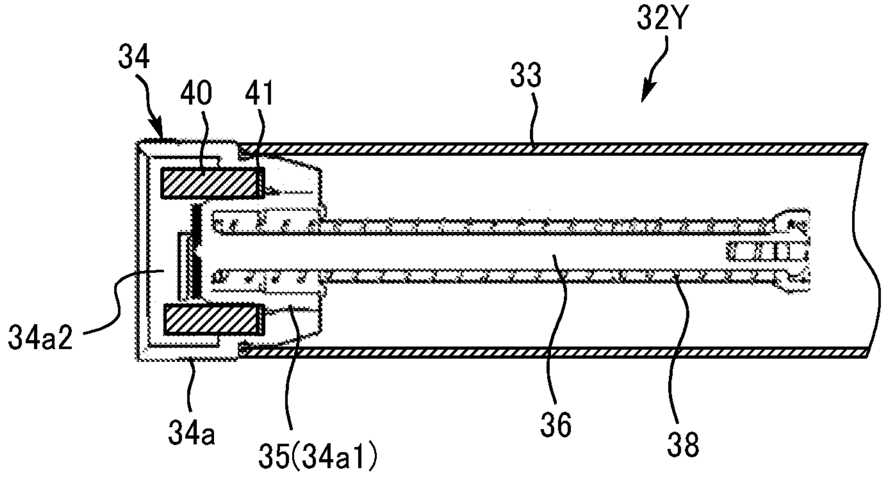
FIG. 4 is a cross-sectional view of a main part of a toner container.

The toner container 32Y includes a seal 40 to seal a gap between the shutter 35 and the through-hole 34*al* with the through-hole 34*al* being closed by the shutter 35. The rod 36 is united with the shutter 35. The rod 36 extends in the opening and closing directions of the shutter 35 (i.e., the left and right direction in FIGS. 4, 5A, 5B, and 5C) inside the toner container 32Y. As illustrated in FIG. 4, the rod 36 is disposed so that the axis of the rod 36 substantially coincides with the rotation center of the container body 33. Such a configuration reduces a failure such as a positional displacement of the shutter 35 when the container body 33 is driven to rotate.

With reference to FIGS. 4, 5A, 5B, and 5C, the holder 34 includes the attachment 34*a* (i.e., the cap) and an extending portion 34*b*, and is secured to the container body 33. The holder 34 receives a rotational driving force from the body of the image forming apparatus and rotates around the first conveyance passage 91 with the container body 33. The attachment 34*a* (the cap) of the holder 34 has the through-hole 34*al* and is vertically arranged in the direction in which the first conveyance passage 91 is inserted (i.e., the insertion direction, and the left and right direction in FIGS. 4, 5A, 5B, and 5C). The attachment 34*a* has an opening portion 34*a*2 (a cavity) that opens toward the front side in the insertion direction of the first conveyance passage 91 (i.e., upstream in the insertion direction and the left side of the toner container 32Y in FIGS. 4, 5A, 5B, and 5C). The opening portion 34*a*2 is a concave portion having a substantially columnar shape centered on the rotation center of the container body 33.

The extending portion 34*b* of the holder 34 holds the rod 36 movably in the opening and closing directions on the opposite side (i.e., the right side in FIGS. 4, 5A, 5B, and 5C) to the side on which the shutter 35 is disposed inside the toner container 32Y. The extending portion 34*b* is formed in a substantially U shape so as to extend in the left and right direction of FIGS. 4, 5A, 5B, and 5C inside the toner container 32Y (i.e., the container body 33). The compression spring 38 as a biasing member is wound around the rod 36 between the shutter 35 and a wall of the extending portion 34*b*. The compression spring 38 biases the shutter 35 in the direction to which the through-hole 34*al* is closed (i.e., toward the left side in FIGS. 4, 5A, 5B, and 5C).

Figure 5A:
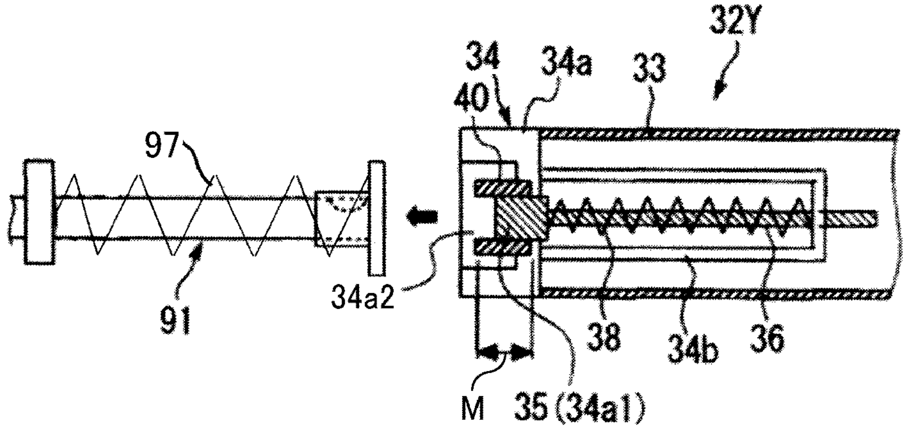
FIGS. 5A, 5B, and 5C are diagrams illustrating an operation of attaching a first conveyance passage to a toner container.

In such a configuration, the shutter 35 is pushed by the first conveyance passage 91 in conjunction with the installation operation of the toner container 32Y to the body of the image forming apparatus 100 (i.e., the installation section 31). The shutter 35 moves to the inside of the toner container 32Y with the rod 36 against the biasing force of the compression spring 38 (i.e., the biasing member) and opens the through-hole 34*a*1. Specifically, the shutter 35 (and the rod 36) moves in the order as illustrated in FIGS. 5A and 5C to open the through-hole 34*a*1. In contrast, removing the toner container 32Y from the body of the image forming apparatus 100 (the installation section 31) causes the first conveyance passage 91 to release the shutter 35 from the above-described pushed state, and the biasing force of the compression spring 38 moves the shutter 35 together with the rod 36 toward the through-hole 34*a*1 to close the through-hole 34*a*1. Specifically, the shutter 35 (and the rod 36) moves in the order as illustrated in FIGS. 5C and 5A to close the through-hole 34*a*1. As illustrated in FIG. 5C, when the installation of the toner container 32Y in the body of the image forming apparatus 100 is completed, the shutter 35 contacts the wall of the extending portion 34*b*, and the compression spring 38 is stored in the concave portion of the shutter 35. Such a configuration can prevent a problem that toner in the toner container 32Y adheres to the compression spring 38 when the toner container 32Y is set in the body of the image forming apparatus 100.

Figure 5B:
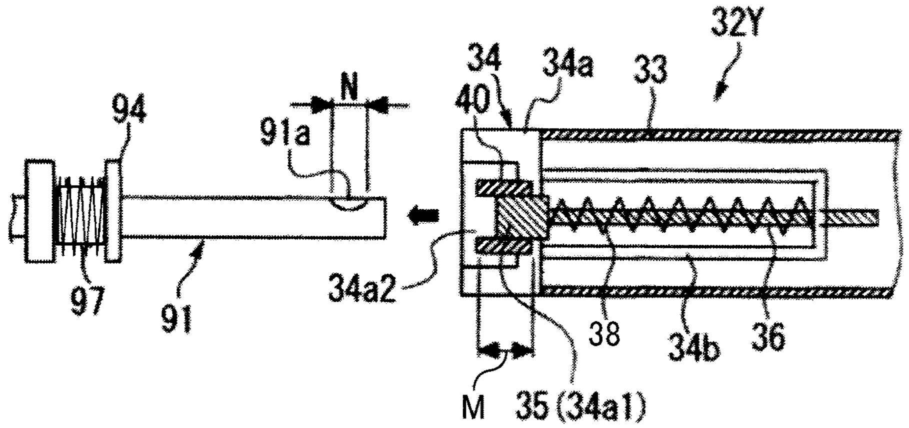
Figure 5C:
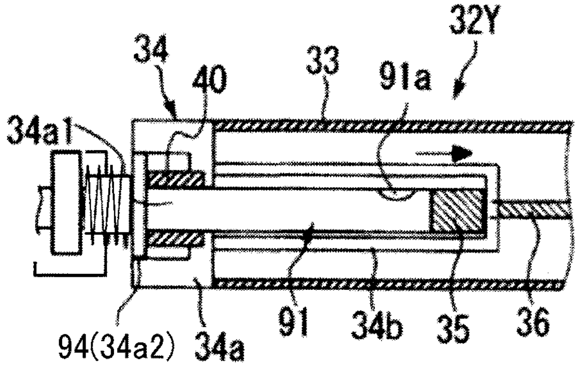

With reference to FIGS. 5A to 5C, the first conveyance passage 91 in the present embodiment has a fitting portion 94 to fit the opening portion 34*a*2 in conjunction with the insertion operation of the first conveyance passage 91 to the through-hole 34*a*1. Specifically, the fitting portion 94 has an outer diameter larger than the outer diameter of a main portion of the first conveyance passage 91. The fitting portion 94 has a substantially columnar shape to engage the opening portion 34*a*2 of the attachment 34*a*. The fitting portion 94 is slidable along the main portion of the first conveyance passage 91 in the installation direction of the toner container 32Y indicated by arrow DR1 in FIGS. 5A and 5B. A compression spring 97 is disposed in the first conveyance passage 91 to bias the fitting portion 94 downstream in the insertion direction. The fitting portion 94 also functions as a cover that covers a first inlet port 91*a* of the first conveyance passage 91. As illustrated in FIG. 5A, the fitting portion 94 closes the first inlet port 91*a* when the toner container 32Y is not set. As illustrated in FIG. 5C, the fitting portion 94 slides and moves, and the main part of the first conveyance passage 91 is inserted inside the container body 33 when the toner container 32Y is set. FIG. 5B illustrates a state in which the first inlet port 91*a* is exposed by sliding the fitting portion 94. With such a configuration, when the first conveyance passage 91 is inserted into the toner container 32Y in conjunction with the installation operation of the toner container 32Y, the fitting portion 94 is biased by the compression spring 97 to fit the opening portion 34*a*2. In contrast, when the first conveyance passage 91 is pulled out from the toner container 32Y in conjunction with the detaching operation of the toner container 32Y, the fitting portion 94 is pulled out from the opening portion 34*a*2.

Figure 6:
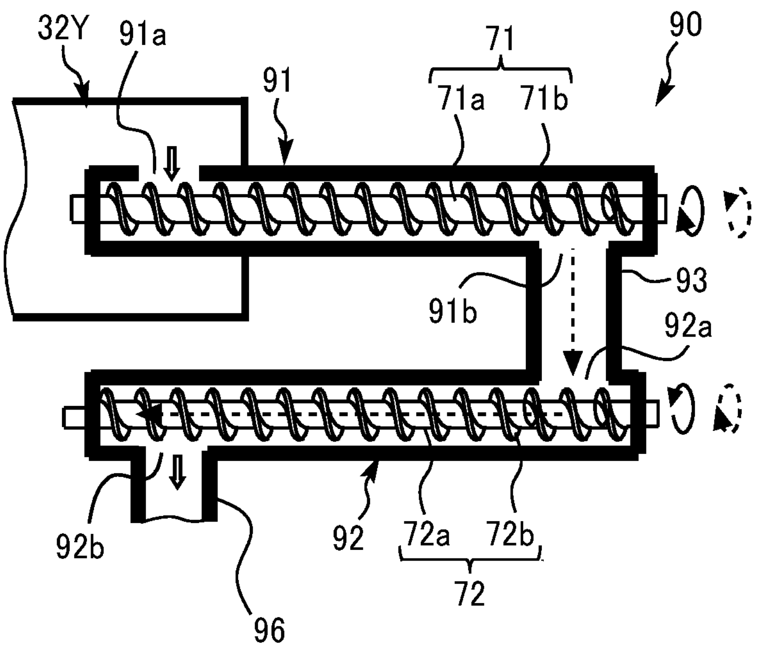
FIG. 6 is a schematic view of a toner supply device (powder conveying device).
Figure 7:
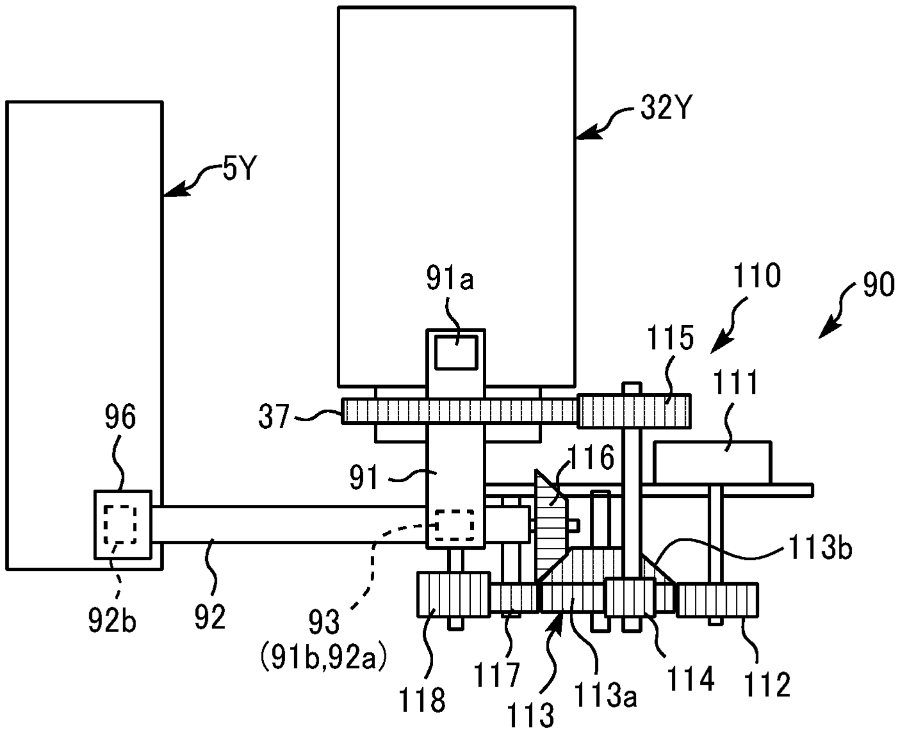
FIG. 7 is a plan view of a driver of the toner supply device.
Figure 8:
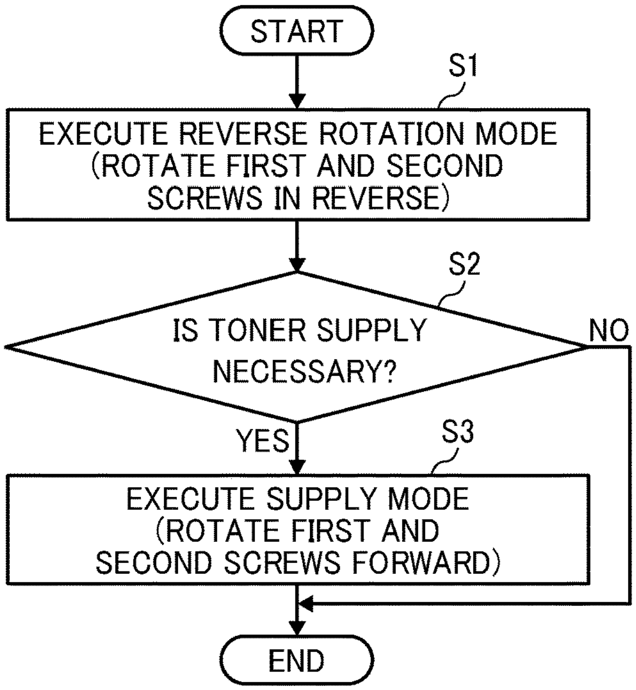
FIG. 8 is a flowchart of control performed in the toner supply device, according to an embodiment of the present disclosure.

With reference to FIGS. 6 to 8, the configuration and operation of the toner supply device 90 as a powder conveying device in the present embodiment is described below. To easily understand the configuration of the toner supply device 90, the direction of arrangement of the second conveyance passage 92 with respect to the first conveyance passage 91 is illustrated in FIG. 6 in different orientations from the actual arrangement. Actually, as illustrated in FIGS. 3 and 7, the second conveyance passage 92 is disposed to be substantially orthogonal to the first conveyance passage 91.

With reference to FIGS. 6 and 7, a toner supply device 90 as a powder conveying device is provided with, for example, the first conveyance passage 91, the fall passage 93 (first fall passage), the second conveyance passage 92, and the conveying tube 96 (second conveyance passage). Toner as powder discharged from the toner container 32Y (supply source) is conveyed toward the developing device 5Y (supply destination) via the conveyance passages 91, 92, 93, and 96.

The first conveyance passage 91 includes a first conveying screw 71 serving as a first conveyor that conveys toner (powder) in a substantially horizontal direction. The first conveying screw 71 includes a shaft portion 71*a* and a screw portion 71*b*. The screw portion 71*b* is spirally wound around the shaft portion 71*a*. The first conveying screw 71 is made of a metal material or a resin material. The first conveyance passage 91 is a conveying tube having a circular cross section and is made of a metal material or a resin material. In the first conveyance passage 91, the first inlet port 91*a* that communicates with the toner container 32Y is formed upstream from the first conveyance passage 91. A first outlet port 91*b* (outlet port) that communicates with the fall passage 93 is formed downstream from the first conveyance passage 91.

The fall passage 93 is a passage through which the toner having flowed out from the outlet port (first outlet port 91*b*) of the first conveyance passage 91 falls (falls by its own weight), and is formed to extend in a substantially vertical direction. The fall passage 93 may be a conveying tube having a circular cross section or a conveying tube having a polygonal cross section. The fall passage 93 may be inclined with respect to the vertical direction. In this case, a state in which toner slides down on an inclined surface of the inclined fall passage 93 is also defined as a state in which "toner (powder) falls". In the present embodiment, a passage that relays between the first conveyance passage 91 and the second conveyance passage 92 is used as the fall passage 93. Even when the first conveyance passage 91 and the second conveyance passage 92 are arranged side by side to be in close contact with each other in the substantially vertical direction, it is defined that the fall passage 93 is formed in the intermediate portion.

The second conveyance passage 92 is provided with a second conveying screw 72 as a second conveyor. When the toner that has fallen in the fall passage 93 flows in from an inflow port (a second inlet port 92*a*), the second conveying screw 72 conveys the toner in a substantially horizontal direction. The second conveying screw 72 includes a shaft portion 72*a* and a screw portion 72*b* spirally wound around the shaft portion 72*a*. The second conveying screw 72 is made of a rubber material such as elastomer (or a metal material or a resin material). The second conveyance passage 92 is a conveying tube having a circular cross section and is made of a metal material or a resin material. In the second conveyance passage 92, the second inlet port 92*a* that communicates with the toner container 32Y is formed upstream from the second conveyance passage 92. A second outlet port 92*b* that communicates with the conveying tube 96 (second fall passage) is formed downstream from the second conveyance passage 92.

The conveying tube 96 (second fall passage) is a passage through which the toner having flowed out from the second outlet port 92*b* of the second conveyance passage 92 falls by its own weight and is formed to extend in a substantially vertical direction. The toner having fallen from the conveying tube 96 by its own weight is supplied into the developing device 5Y. Although toner is conveyed from the second conveyance passage 92 to the developing device 5Y via the conveying tube 96 in the present embodiment, toner may be directly conveyed from the second conveyance passage 92 to the developing device 5Y.

As illustrated in FIG. 6, in the toner supply device 90 (powder conveying device) with a configuration as described above, the toner that flows from the toner container 32Y into the first conveyance passage 91 in the direction indicated by a white arrow is conveyed substantially horizontally (i.e., in a direction indicated by a dashed arrow in FIG. 6) from the left side to the right side by the first conveying screw 71 that rotates in a forward direction (i.e., in a direction indicated by a solid arrow). Thus, the toner falls by its own weight in the direction indicated by a dashed arrow (from above to below) via the fall passage 93. Thereafter, the toner that flows into the second conveyance passage 92 from the fall passage 93 is conveyed from the right side to the left side in a substantially horizontal direction (i.e., in the direction indicated by the dashed arrow in FIG. 6) by the second conveying screw 72 that rotates in a forward direction (i.e., in the direction indicated by the solid arrow). Thereafter, the toner that flows into the conveying tube 96 from the second conveyance passage 92 falls in the conveying tube 96 by its own weight. Thus, the toner flows into the developing device 5Y. Such a control mode (or an operation) in which toner as powder is supplied from the toner container 32Y serving as a supply source to the developing device 5Y serving as a supply destination is referred to as a "supply mode" as needed.

The plurality of conveyance passages 91 to 93 and 96 are disposed in the toner supply device 90 as described above. Toner can be supplied even when the toner container 32Y serving as a supply source and the developing device 5Y serving as a supply destination are separated from each other or the directions thereof are different from each other. In other words, the flexibility of the layout of the toner container 32Y and the developing device 5Y can be enhanced. In particular, with reference to FIG. 7, in the present embodiment, a conveyance direction in which toner (powder) is conveyed in the first conveyance passage 91 and a conveyance direction in which toner is conveyed in the second conveyance passage 92 are in an intersecting relationship (i.e., in the present embodiment, a substantially orthogonal relationship). As a result, the flexibility of the layout of the toner container 32Y and the developing device 5Y can be further enhanced.

In the toner supply device 90 according to the present embodiment, the amount of powder (toner) per unit time conveyed by the first conveying screw 71 (first conveyor) in the supply mode in the first conveyance passage 91 is set to be smaller than the amount of powder (toner) per unit time conveyed by the second conveying screw 72 (second conveyor) in the supply mode in the second conveyance passage 92. The above-described "amount of powder (toner) per unit time" is substantially synonymous with the "toner conveyance speed in the conveyance passage". However, if the amount of powder per unit time conveyed by the second conveying screw 72 increases depending on temperature and humidity environment and a condition of the toner, and the toner conveyance speed in the downstream conveyance passage 92 is excessively higher than the toner conveyance speed in the upstream conveyance passage 91, the downstream conveyance passage 92 is likely to be short of toner, and a toner supply failure from the supply source to the supply destination is likely to occur. As a result, in the present embodiment, the toner conveyance speed in the downstream conveyance passage 92 is set to be higher than the toner conveyance speed in the upstream conveyance passage 91 (i.e., a speed difference is provided) to such an extent that such toner supply failure does not occur. Specifically, providing a difference in at least one of, for example, the number of rotations of the conveying screw or a screw diameter and a screw pitch of the screw portion generates a difference between the toner conveyance speeds by the two screws. On the other hand, as the amount of powder per unit time conveyed by the second conveying screw 72 increases, toner clogging is likely to occur. Thus, in the present embodiment, a "reverse rotation mode" is performed as described below.

As described above, the conveyors (the first conveying screw 71 as the first conveyor and the second conveying screw 72 as the second conveyor) are disposed in the conveyance passages (the conveyance passage 91 and the second conveyance passage 92) of the toner supply device 90. When the supply mode in which toner (powder) is supplied from the toner container 32Y as the supply source to the developing device 5Y as the supply destination, the conveyors rotate in the forward direction to convey toner.

The toner supply device 90 (powder conveying device) according to the present embodiment executes a "reverse rotation mode" in which the conveying screws 71 and 72 serving as the conveyors are rotated in reverse (i.e., in the directions indicated by the dashed arrows in FIG. 6) before a "supply mode" is executed. Specifically, the "reverse rotation mode" is a control mode in which the plurality of conveying screws 71 and 72 (conveyors) respectively disposed in the plurality of conveyance passages 91 and 92 are rotated in the reverse directions (i.e., in the directions indicated by the dashed arrows in FIG. 6). In the present embodiment, the "reverse rotation mode" is executed at a timing when the image forming apparatus 100 starts a print operation (i.e., a timing after a controller 500 of the image forming apparatus 100 receives a print instruction) and immediately before the toner supply operation (supply mode) to the developing device 5Y by the toner supply device 90 is executed.

As a result, in the toner supply device 90, the toner clogging (conveyance failure) in the conveyance passage is less likely to occur. Specifically, in the conveyance passages 91 and 92, the toner remaining without being conveyed to the developing device 5Y (supply destination) is left as it is, or the toner conveyed from the upstream side is piled up with the remaining toner. Thus, the remaining toner is tightened. When the supply mode is resumed in a state in which toner in the conveyance passages 91 and 92 is tightened as described above, the tightened toner is rapidly conveyed. Thus, toner clogging is likely to occur in the conveyance passages 91 and 92. In particular, in the present embodiment, as described above, the toner conveyance speed in the downstream conveyance passage 92 is set to be higher than the toner conveyance speed in the upstream conveyance passage 91 to such an extent that a toner supply failure does not occur. As a result, a problem of toner shortage in the downstream conveyance passage 92 is unlikely to occur. Meanwhile, toner clogging is likely to occur in the conveyance passages (in particular, in the vicinity of the connecting portion of the plurality of conveyance passages). In contrast, in the present embodiment, the reverse rotation mode is executed to convey toner in each of the conveyance passages 91 and 92 in the direction opposite to the normal conveyance direction before the supply mode is executed. Thus, tightening of toner in the conveyance passages 91 and 92 is reduced. Accordingly, even if the supply mode is resumed, toner clogging (conveyance failure) is less likely to occur in the conveyance passages 91 and 92. As a result, a toner supplying device 90 according to the present embodiment is less likely to cause a toner conveyance failure as a whole. Thus, the toner supplying device 90 can stably supply toner from the toner container 32Y (supply source) to the developing device 5Y (supply destination) without excess or deficiency.

With reference to FIG. 7, the toner supply device 90 (powder conveying device) according to the present embodiment includes the drive mechanism 110 as a driver that drives the first conveying screw 71 (first conveyor) and drives the second conveying screw 72 (second conveyor). That is, in the present embodiment, a driver for driving the first conveying screw 71 and a driver for driving the second conveying screw 72 are not separately and independently disposed. A single driver is used to drive the first conveying screw 71 and the second conveying screw 72. In the present embodiment, the toner container 32Y (container body 33) is also driven by the single driver for driving the first conveying screw 71 and the second conveying screw 72. As a result, the cost and size of the apparatus can be reduced as compared with a case in which a plurality of independent drivers are separately disposed.

Specifically, with reference to FIG. 7, the drive mechanism 110 serving as a driver includes, for example, the drive motor 111 and a plurality of gear trains 112 to 118. The driving force of the drive motor 111 is transmitted from a drive gear 112 disposed on a motor shaft to the gear 37 of the toner container 32Y via idler gears 114 and 115. Thus, the toner container 32Y (container body 33) is driven to rotate. The driving force of the drive motor 111 is transmitted from the drive gear 112 disposed on the motor shaft to a driven gear 118 of the first conveying screw 71 in the first conveyance passage 91 via a spur gear 113*a* of a two-step gear 113 and an idler gear 117. Thus, the first conveying screw 71 is driven to rotate. The driving force of the drive motor 111 is transmitted from the drive gear 112 disposed on the motor shaft to a bevel gear 116 of the second conveying screw 72 in the second conveyance passage 92 via the two-step gear 113 (a spur gear 113*a* and a bevel gear 113*b* are disposed in a stepped manner). Thus, the second conveying screw 72 is driven to rotate. In the drive mechanism 110 having a configuration as described above, when the drive motor 111 is driven by control of the controller 500, the toner container 32Y (container body 33), the first conveying screws 71, and the second conveying screw 72 are driven to rotate. In the "supply mode", the ratio of the toner (toner concentration) in the developer G in the developing device 5Y is detected by the toner concentration sensor 56 (see FIG. 2). Thus, the drive motor 111 is appropriately driven (forward rotation) so that the detection result falls within a specified range. Specifically, each time the toner concentration detected by the toner concentration sensor 56 falls below a specified value, the drive motor 111 is driven for a specified time (forward rotation). The drive motor 111 is a forward and reverse bi-directional rotation type motor, rotates forward in the supply mode, and rotates in reverse in the reverse rotation mode by the control of the controller 500.

In the present embodiment, a time T1 during which the first conveying screw 71 and the second conveying screw 72 are rotated in the reverse direction when the reverse rotation mode is executed once is set to be equal to or less than a time TO during which the first conveying screw 71 and the second conveying screw 72 are rotated in the forward direction when the supply mode is executed once (T1≤T0). Specifically, the time TO during which the drive motor 111 is rotated in the forward direction in the supply mode is set to be equal to or less than the time T1 during which the drive motor 111 is rotated in the reverse direction in the reverse rotation mode. Such a configuration can reduce a problem that toner in the conveyance passages 91 and 92 is excessively conveyed in the reverse direction by the execution of the reverse rotation mode and causes toner clogging on the upstream side of the conveyance passages 91 and 92 (i.e., the upstream side during the forward rotation).

With reference to FIG. 8, a description is given below of the control with respect to the reverse rotation mode according to the present embodiment. As illustrated in FIG. 8, first, when a print instruction is received by the controller 500 of the image forming apparatus 100, the reverse rotation mode is executed (in step S1 of FIG. 8). That is, the controller 500 causes the drive motor 111 to drive to rotate the first conveying screw 71 and the second conveying screw 72 in reverse for a specified time T1 (i.e., a time shorter than the execution time TO of the supply mode). Thereafter, the controller 500 determines whether toner supply is necessary (in step S2 of FIG. 8). Specifically, the controller 500 determines whether the toner concentration detected by the toner concentration sensor 56 (see FIG. 2) of the developing device 5Y is lower than a specified value. As a result, when the controller 500 determines that toner supply is necessary, the controller 500 executes the "supply mode" (in step S3 of FIG. 8) and ends the current flow. When the controller 500 determines that toner supply is not necessary, the controller 500 ends the current flow as it is.

In the present embodiment, the controller 500 executes "reverse rotation mode" at the timing when the printing operation is started (i.e., the timing after the print instruction is received). In contrast, the controller 500 may execute the "reverse rotation mode" at least one of the following timings: A) timing before or at the start of a printing operation in the image forming apparatus 100 provided with the toner supply device 90 (powder conveying device); B) timing after a main power supply of image forming apparatus 100 is turned on; C) timing at the start of driving of the developing device 5Y as a supply destination; D) timing before the start of the printing operation and at a time of adjusting image forming conditions of the photoconductor drum 1Y (photoconductor) or the intermediate transfer belt 8 (intermediate transferor) in the image forming apparatus 100, in other words, at a time of execution of process control; E) timing at the start of driving of the photoconductor drum 1Y (photoconductor) or the intermediate transfer belt 8 (intermediate transferor) in the image forming apparatus 100; and F) timing after the printing operation is started and when the supply mode has not been performed for a specified time. Note that in the description of the timing D, the image forming conditions are, for example, a developing bias applied to the developing roller 51, a charging bias applied to the charging device 4Y, and the amount of exposure of the exposure device 7. At the timing F, the reverse rotation mode is executed on, for example, a toner supply device 90 for a color on which the supply mode is not performed during execution of a monochromatic mode (i.e., printing with only black toner). Even at the timings A to F described above, the controller 500 executes the reverse rotation mode before the supply mode is executed. Thus, a toner conveyance failure is unlikely to occur in the toner supply device 90.

First Modification

Figure 9:
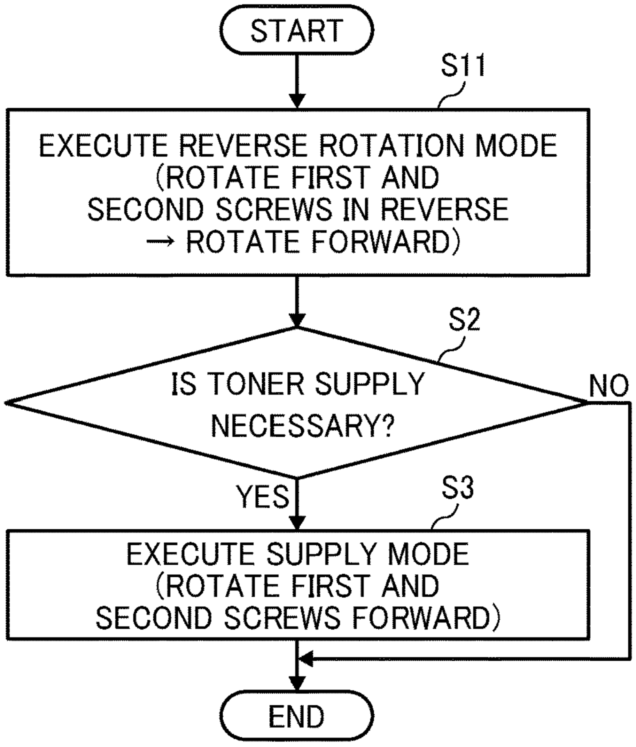
FIG. 9 is a flowchart of control performed in the toner supply device, according to a first modification.

As illustrated in FIG. 9, a reverse rotation mode according to a first modification of the above-described embodiment is a control mode in which each of the first conveying screw 71 and the second conveying screw 72 (conveyors) is rotated in the forward direction after each of the first conveying screw 71 and the second conveying screw 72 is rotated in the reverse direction. That is, in the first modification, each of the first conveying screw 71 and the second conveying screw 72 is rotated in the reverse direction before the supply mode is executed, and immediately thereafter, each of the first conveying screw 71 and the second conveying screw 72 is rotated in the forward direction. By executing such control, the toner conveyed in the reverse direction after the reverse rotation mode is started is conveyed again in the forward direction and is returned to (or approaches) the original position. Accordingly, a problem can be reduced that the amount of toner supplied to the developing device 5Y is initially insufficient when the supply mode is resumed. In order to ensure such an effect, in the reverse rotation mode, the time T2 during which each of the first conveying screw 71 and the second conveying screw 72 is rotated in the forward direction is preferably set to be equal to (or slightly shorter than) the time T1 during which each of the first conveying screw 71 and the second conveying screw 72 is rotated in the reverse direction. Specifically, as illustrated in FIG. 9, first, when the controller 500 of the image forming apparatus 100 receives a print instruction, the reverse rotation mode is executed (in step S11 of FIG. 9). That is, each of the first conveying screw 71 and the conveying screw 72 is driven to rotate by the drive motor 111 in the reverse direction for a specified time T1. Thereafter, each of the first conveying screw 71 and the second conveying screw 72 is driven to rotate in the forward direction for a specified time T2. Thereafter, the controller 500 determines whether toner supply is necessary (in step S2 of FIG. 8). As a result, when the controller 500 determines that toner supply is necessary, the controller 500 executes the "supply mode" (in step S3 of FIG. 8) and ends the current flow. When the controller 500 determines that toner supply is not necessary, the controller 500 ends the current flow as it is. Also in the toner supply device 90 according to the first modification, the "reverse rotation mode" in which each of the first conveying screw 71 and the second conveying screw 72 is rotated in the reverse direction is executed before the "supply mode" is executed. Thus, the toner conveyance failure is less likely to occur.

Second Modification

Figure 10:
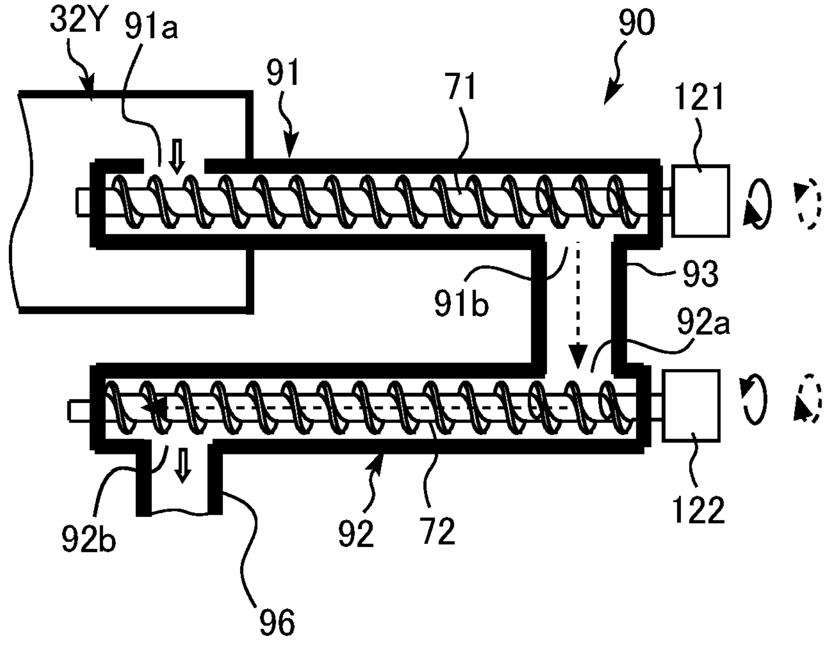
FIG. 10 is a schematic view of a toner supply device according to a second modification.

As illustrated in FIG. 10, a toner supply device 90 according to a second modification is separately provided with a driver that drives the first conveying screw 71 and a driver that drives the second conveying screw 72. Specifically, the toner supply device 90 is provided with a first drive motor 121 that drives to rotate the first conveying screw 71 and a second drive motor 122 that drives to rotate the second conveying screw 72. Each of the first drive motor 121 and the second drive motor 122 is a forward and reverse bi-directional rotation type motor. The controller 500 controls each of the first drive motor 121 and the second drive motor 122 to rotate in the forward direction in the supply mode and controls each of the first drive motor 121 and the second drive motor 122 to rotate in the reverse direction in the reverse rotation mode. As a result, each of the first conveying screw 71 and the second conveying screw 72 rotates in the forward direction indicated by a solid arrow in FIG. 10 in the supply mode and rotates in the reverse direction indicated by a dashed arrow in FIG. 10 in the reverse rotation mode. In the toner supply device 90 according to the second modification, the controller 500 executes the "reverse rotation mode" in which each of the first conveying screw 71 and the second conveying screw 72 is rotated in the reverse direction is executed before the "supply mode" is executed. Thus, a toner conveyance failure is less likely to occur.

Third Modification

Figure 11:
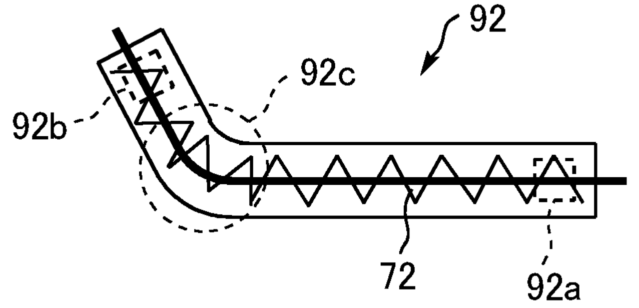
FIG. 11 is a top view of a second conveyance passage according to a third modification.

As illustrated in FIG. 11, a toner supply device 90 (powder conveying device) according to a third modification is provided with a conveyance passage (a curved conveyance passage 92*c*) in the second conveyance passage 92. The second conveying screw 72 (second conveyor) is made of an elastic material such as a rubber material and has elasticity to follow the shape of the second conveyance passage 92 (curved conveyance passage 92*c*). As described above, the second conveyance passage 92 is provided with the curved conveyance passage 92*c* that can convey toner, thus further enhancing the flexibility of the layout of the toner container 32Y (supply source) and the developing device 5Y (supply destination). In the toner supply device 90 according to the third modification, the controller 500 executes the "reverse rotation mode" in which each of the first conveying screw 71 and the second conveying screw 72 is rotated in the reverse direction is executed before the "supply mode" is executed. Thus, a toner conveyance failure is less likely to occur.

As described above, the toner supply device 90 (powder conveying device) according to the present embodiment includes the first conveying screw 71 and the second conveying screw 72 (conveyors) that rotate in the forward direction to convey toner (powder) when the "supply mode" in which toner (powder) is supplied from the toner container 32Y (supply source) to the developing device 5Y (supply destination). The first conveying screw 71 and the second conveying screw 72 are disposed in the conveyance passage 91 and the second conveyance passage 92 (conveyance passages), respectively. The controller 500 executes a "reverse rotation mode" in which each of the first conveying screw 71 and the second conveying screw 72 (conveyors) is rotated in the reverse direction before the controller 500 executes the "supply mode". As a result, a toner conveyance failure is less likely to occur.

In the above-described embodiments, the present disclosure is applied to the toner supply device 90 (powder conveying device) that conveys toner as powder. The application of the powder conveying device of the present disclosure is not limited thereto. The present disclosure can also be applied to a powder conveying device that conveys powder, for example, waste toner, recycled toner, or two-component developer (developer containing toner and carrier). In the present embodiment, the present disclosure is applied to the toner supply device 90 (powder conveying device) that conveys toner (powder) from the toner container 32Y as a supply source to the developing device 5Y as a supply destination. The application of the supply source and the supply destination of the powder conveying device is not limited thereto. Various supply sources and supply destinations can be set. In the present embodiment, as the toner container 32Y serving as the supply source, a bottle-shaped container that discharges toner by rotating the container body 33 is used. The toner container 32Y serving as the supply source is not limited thereto, and, for example, a container in which a conveyor that conveys toner toward an outlet port is disposed in the container, or a box-shaped container can be used. In the present embodiment, the present disclosure is applied to the toner conveying device (toner supply device 90) that is provided with the two conveying screws 71 and 72 in the two conveyance passages 91 and 92, respectively. Alternatively, the present disclosure can also be applied to a powder conveying device that is provided with a conveyor in a conveyance passage or a powder conveying device that is provided with three or more conveyors in three or more conveyance passages, respectively. Even in such a case, an advantageous effect equivalent to that of the present embodiment can be obtained.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium also includes a storage medium for storing processor readable code such as a floppy disk, a hard disk, a compact disc read-only memory (CD-ROM), a magnetic tape device, or a solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

REFERENCE SIGNS LIST

5Y Developing device (Supply destination)
32Y, 32M, 32C, 32K Toner container (Supply source)
71 First conveying screw (First conveyor, conveyor)
72 Second conveying screw (Second conveyor, conveyor)
90 Toner supply device (Powder conveying device)
91 First conveyance passage (Conveyance passage)
92 Second conveyance passage (Conveyance passage)
93 Fall passage
100 Image forming apparatus (Body of image forming apparatus)
110 Drive mechanism (Driver)

The invention claimed is:

1. An image forming apparatus, comprising:
a first conveyor to rotate in a first forward direction to convey powder in a supply mode;
a first conveyance passage in which the first conveyor is disposed;
a first fall passage to receive the powder from a first outlet port of the first conveyance passage;
a second conveyor to rotate in a second forward direction to convey the powder in the supply mode;
a second conveyance passage in which the second conveyor is disposed;
a second fall passage to receive the powder from a second outlet port of the second conveyance passage; and
a controller configured to execute a reverse rotation mode to first rotate the first conveyor in a first reverse direction and the second conveyor in a second reverse direction, and then to rotate the first conveyor in the first forward direction and the second conveyor in second forward direction immediately thereafter such that the time the first conveyor is rotated in the first forward direction and the second conveyor is rotated in the second forward direction is substantially equal to the time rotated in the first reverse direction and the second reverse direction before execution of the supply mode, wherein
a first size of the first conveyor and a second size of the second conveyor are substantially the same, and
a first length of the first conveyor and a second length of the second conveyor are substantially the same.

2. The image forming apparatus according to claim 1, wherein:
the first conveyance passage is connected to the second conveyance passage by the first fall passage.

3. The image forming apparatus according to claim 2, wherein:
the first conveyance passage is connected to the second conveyance passage through the first outlet port by the first fall passage.

4. The image forming apparatus according to claim 1, wherein:
the second conveyor is made of an elastic or rubber material.

5. The image forming apparatus according to claim 1, wherein:
the second conveyance passage comprises a curved conveyance passage connected to the second outlet port.

6. The image forming apparatus according to claim 5, wherein:
the second conveyor is made of an elastic or rubber material, and
the second conveyor is disposed in the curved conveyance passage.

* * * * *